US011952837B1

(12) United States Patent
Carter

(10) Patent No.: US 11,952,837 B1
(45) Date of Patent: Apr. 9, 2024

(54) COLLAPSIBLE LADDER

(71) Applicant: T-H Marine Supplies, LLC, Huntsville, AL (US)

(72) Inventor: John W. Carter, Crossvile, TN (US)

(73) Assignee: T-H Marine Supplies, LLC, Huntsville, AL (US)

( * ) Notice: Subject to any disclaimer, the term of this patent is extended or adjusted under 35 U.S.C. 154(b) by 0 days.

(21) Appl. No.: 18/133,688

(22) Filed: Apr. 12, 2023

Related U.S. Application Data

(60) Provisional application No. 63/475,578, filed on Nov. 21, 2022, provisional application No. 63/475,435, filed on Nov. 9, 2022.

(51) Int. Cl.
*E06C 1/38* (2006.01)
*B63B 27/14* (2006.01)
*E06C 1/387* (2006.01)

(52) U.S. Cl.
CPC ............ *E06C 1/381* (2013.01); *B63B 27/146* (2013.01); *E06C 1/387* (2013.01)

(58) Field of Classification Search
CPC ......... E06C 1/381; E06C 1/387; B63B 27/14; B63B 27/146; B63B 2027/141
USPC .................................... 182/156, 90; 114/362
See application file for complete search history.

(56) References Cited

U.S. PATENT DOCUMENTS 1,313,444 A * 8/1919 Witherow ............... E06C 1/387 182/189
1,831,332 A * 11/1931 Wagner ..................... E06C 9/14 182/95
2,148,099 A * 2/1939 Bray ....................... E06C 1/381 182/189
2,816,485 A * 12/1957 Schurger ................ B23Q 15/00 82/122
3,019,851 A * 2/1962 Doss ......................... E06C 7/46 182/189
3,033,309 A * 5/1962 Fugere ...................... B60R 3/02 182/189
3,729,063 A * 4/1973 Hein ....................... E06C 1/381 182/189
4,068,770 A * 1/1978 Boehringer ............... B64C 1/22 14/71.1
4,132,288 A * 1/1979 Bingham ................ E06C 1/381 182/189
4,432,436 A * 2/1984 Suiter ....................... E06C 5/02 182/189
4,700,420 A * 10/1987 Belanger ................. B25F 1/006 294/51
5,040,635 A * 8/1991 Strickland ................. E06C 1/34 182/189
5,697,470 A * 12/1997 Carle ...................... E06C 1/005 182/35
6,340,071 B1 * 1/2002 Diekemper ............... E06C 1/34 182/189
6,422,342 B1 * 7/2002 Armstrong ................ E06C 5/02 182/127
6,755,146 B1 * 6/2004 Garelick ............... B63B 27/146 182/95
(Continued)

*Primary Examiner* — Abe Massad
*Assistant Examiner* — Shiref M Mekhaeil
(74) *Attorney, Agent, or Firm* — Stephen H. Hall; Alex Huffstutter; Bradley Arant Boult Cummings LLP

(57) ABSTRACT

A collapsible ladder with steps that remained stored within the frame or automatically deploy for use. The ladder can be manual, semi-automatic, or remote controlled.

20 Claims, 15 Drawing Sheets

(56) References Cited

U.S. PATENT DOCUMENTS

| | | | | |
|---|---|---|---|---|
| 6,782,840 | B1 * | 8/2004 | Garelick | E06C 1/381 114/362 |
| 6,938,573 | B1 * | 9/2005 | Garelick | B63B 27/146 114/364 |
| 6,945,189 | B1 * | 9/2005 | Garelick | B63B 27/146 114/362 |
| 7,025,174 | B1 * | 4/2006 | Hawley | B60R 3/02 182/127 |
| 7,182,175 | B1 * | 2/2007 | Schmitt | B63B 27/143 182/88 |
| 8,833,290 | B2 * | 9/2014 | Mueller | B63B 27/30 114/343 |
| 8,944,210 | B2 * | 2/2015 | Sedlack, II | E06C 1/381 182/91 |
| 9,586,655 | B1 * | 3/2017 | Butler | B63B 17/00 |
| 9,611,008 | B1 * | 4/2017 | O'Neal | B63B 3/48 |
| 9,635,849 | B2 * | 5/2017 | Connor | E06C 9/08 |
| 9,969,468 | B2 * | 5/2018 | Price, III | B63B 21/26 |
| 9,975,621 | B2 * | 5/2018 | Rechert | E06C 1/005 |
| 11,302,297 | B2 * | 4/2022 | Scully | G10K 11/004 |
| 11,613,928 | B1 * | 3/2023 | Davidson | E06C 7/50 182/178.3 |
| 2003/0127284 | A1 * | 7/2003 | Cook | E06C 9/08 182/86 |
| 2004/0159279 | A1 * | 8/2004 | Garelick | E06C 1/381 114/362 |
| 2005/0016439 | A1 * | 1/2005 | Mardikian | E06C 5/04 114/362 |
| 2006/0272567 | A1 * | 12/2006 | Scotti | B63B 27/14 114/362 |
| 2007/0278039 | A1 * | 12/2007 | Sedlack | E06C 1/381 182/91 |
| 2010/0192487 | A1 * | 8/2010 | Thornton | E04F 11/064 52/741.2 |
| 2011/0214942 | A1 * | 9/2011 | Niemiec | E06C 1/005 182/19 |
| 2015/0013229 | A1 * | 1/2015 | Shalom | E05F 15/673 49/506 |
| 2015/0291262 | A1 * | 10/2015 | Grovender | B63B 27/146 182/98 |
| 2017/0129574 | A1 * | 5/2017 | Brown | B63B 27/143 |
| 2018/0228142 | A1 * | 8/2018 | Connor | E06C 1/381 |

* cited by examiner

COLLAPSIBLE LADDER

CROSS-REFERENCE TO RELATED APPLICATIONS

This application claims priority to and all the benefits of U.S. Provisional Application Ser. No. 63/475,578 entitled "Remotely Controlled Electric Boat Ladder" filed Nov. 21, 2022, and provisional patent application Ser. No. 63/475,435 entitled "Semi-Automatic Boat Ladder" filed Nov. 9, 2022, the entire contents of which are incorporated by reference herein.

FIELD OF THE DISCLOSURE

This invention is in the field of collapsible ladders. More specifically, it is directed towards a ladder with foldable steps to create a compact ladder for storage in a compartment. In some embodiments, the ladder operates either semi-automatically or automatically. As discussed in the preferred embodiment below, the ladder can be located in the frame, body, or hull of a boat.

DESCRIPTION OF THE PRIOR ART

Conventional ladders have parallel outer elongated rigid support members with longitudinally spaced rungs or steps extending between the support members. For use, this type of ladder typically rests on one end of the ground with the other end on an elevated structure. Additionally, as the preferred embodiment in this instance is a boat ladder, boat ladders typically have a hook-type of arrangement at one end for latching or coupling to the edge of a boat or dock for getting into and out of the boat or dock. Further, the prior art describes ladders that are manually engaged and disengaged, for example, U.S. Pat. No. 6,782,840, the entire disclosure of which is hereby incorporated by reference.

SUMMARY OF THE INVENTION

In view of the foregoing disadvantages inherent in the conventional ladder systems now present in the prior art, the present invention provides an improved compactable ladder, and in its preferred embodiment a compactable boat ladder, which can be deployed for use to enter or exit a boat.

In one embodiment, the present compactable ladder generally comprises an elongated main support beam with at least one set of steps, a storage tube for storing the elongated main support beam and steps, a guide block assembly pivotably attached to the elongated main support beam, and at least one support arm connecting the guide block to a step which can be automatically rotated from the storage position to the use position when the elongated main support beam is pivoted downward about the guide block. Additional features of the present invention will be described hereinafter that will form the subject matter of the claims appended hereto.

In some embodiments, the user will disengage the catch at the end of the storage tube in order to release the elongated main support beam. As the user pulls the elongated main support beam from the storage tube, and pivots it downwards, the steps, in unison, will deploy from their storage position to their use position.

Another object of the present invention comprises generally a compactable ladder, comprising an elongated main support beam with a plurality of steps that are rotatable between a use position and a storage position, a guide block assembly rotatably attached at one end of the elongated main support beam, at least one support arm connected at a first end to the guide block and connected at a second end to the step positioned closest to the guide block assembly, which is configured to rotate at least one of the plurality of steps from a storage position to a use position when the elongated main support bean is rotated about the guide block.

A further object of the invention comprises generally a ladder system with a main support beam with a plurality of rotatably attached steps, a guide block assembly at the end of the main support beam, a step spacer housed within a recess in the main support beam to support the step in the use position, and a support arm connecting the guide block assembly to a step which allows the steps to be automatically rotated from the storage position to the use position when the elongated main support beam is pivoted downward about the guide block assembly.

In certain embodiments of the invention the ladder system further comprises a linear motion actuator connected to the guide block assembly or main support beam and configured to move the compactable ladder system from a first position to a second position.

In this respect, it should be understood that the present invention is not limited to the details of construction and to the arrangements of components set forth in the following description or illustrated in the drawings. The invention is capable of other embodiments and being practiced and carried out in various ways as would be recognized by someone having ordinary skill in the art. It is to be further understood that the terminology used herein is for the purpose of describing the invention and should not be considered as limiting, the scope of the invention.

To the accomplishment of the above and related objects, this invention may be embodied in the form illustrated in the accompanying drawings, recognizing however, that the drawings are illustrative only, and that changes may be made in the specific construction illustrated and described within the scope of the appended claims.

DETAILED DESCRIPTION

Figure 1:
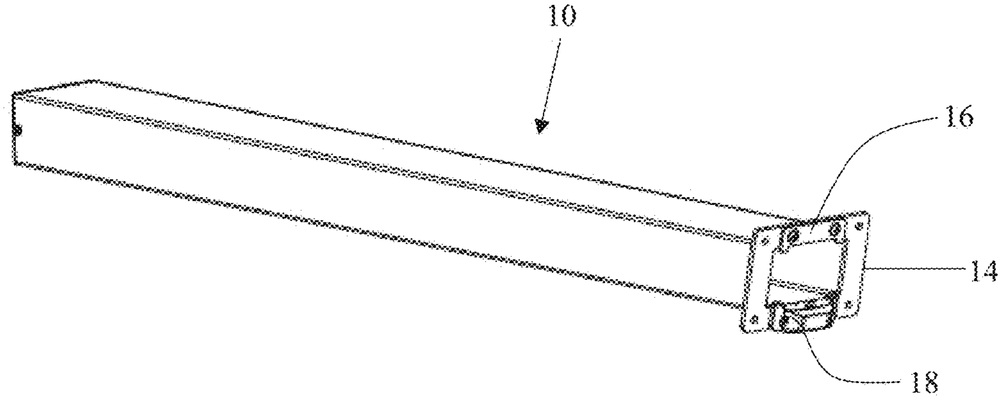
FIG. 1 is a perspective view of an embodiment of the storage compartment.

As shown in the drawings, the present invention provides an improved ladder system. In its preferred embodiment, the present invention provides an improved boat ladder which may be semi-automatic or remotely controlled and used on various boats, including but not limited to passenger vessels. In some situations, it may be advantageous for boaters to have either a semi-automatic or remotely controlled compact electric boat ladder installed on their boat to aid in ladder storage and to help passengers enter or exit the boat. The boat ladder disclosed herein offers many advantageous features not found in the prior art such as either a semi-automatic or remotely controlled deployment or recall of a boat ladder.

In a preferred, primary embodiment, a ladder system 5 comprises a storage compartment and a step assembly 20. Examples of a deployed ladder system 5 can be seen in FIGS. 19, 21, 22, and 23.

Figure 2:
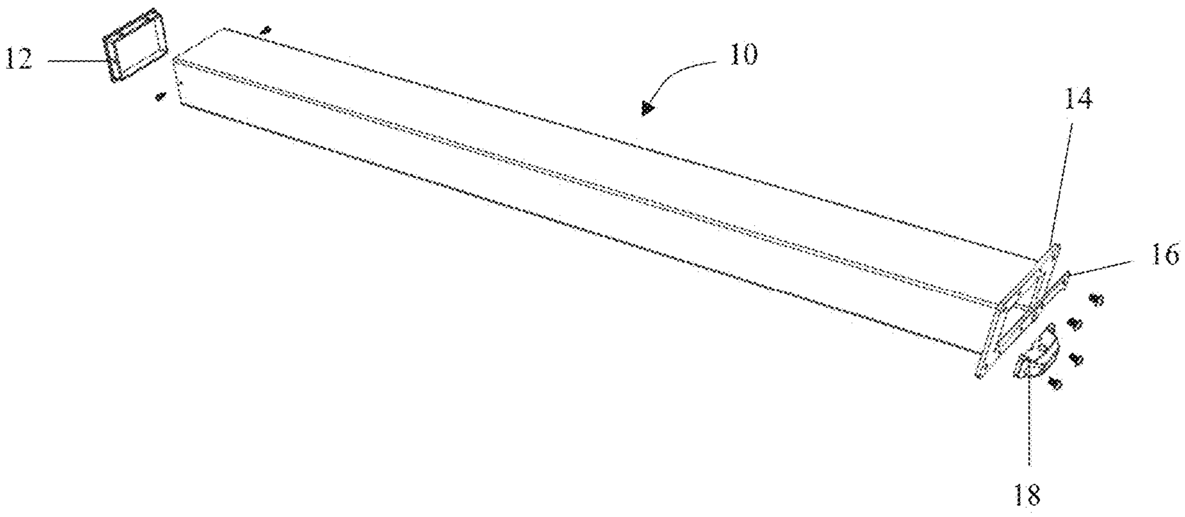
FIG. 2 is an exploded view of an embodiment of the storage compartment.

One embodiment of the storage compartment 10 is shown in FIGS. 1 and 2. The storage compartment 10 may contain an end cap 12, face plate 14, guide plate 16, and storage compartment catch 18. The end cap 12 can be waterproof and can have a hole to allow for water drainage. A hole for drainage is preferred but optional. The face plate 14 can serve as attachment points for the guide plate 16 and storage compartment catch 18 discussed further below. The storage compartment 10 is preferred but optional. In a preferred embodiment, the storage compartment 10 is attached to a boat, or built into a boat hull. In the embodiments where the storage compartment is attached to a boat, it can be secured using any conventional manner, for example, using brackets, screws, or fixed guide rails. The face plate 14 in a preferred embodiment on a boat hull, is placed at an angle such that the face plate 14 is flush with the transom of a boat. In this case the top portion of the storage compartment 10 is longer in length than the bottom portion of the storage compartment 10.

Figure 3:
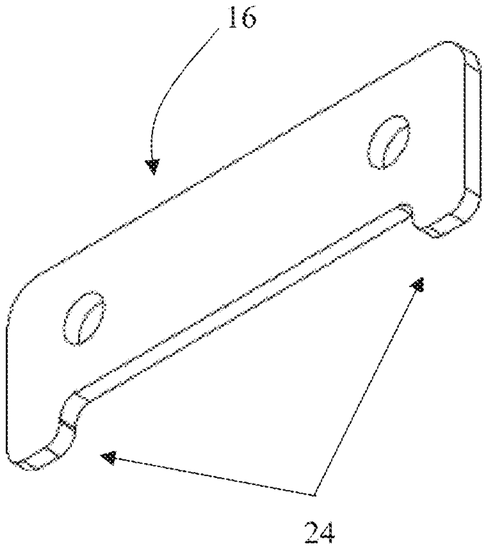
FIG. 3 is a perspective view of an embodiment of the guide plate.

One embodiment of the guide plate 16 is shown in FIG. 3. The guide plate 16 may be used to help guide the step assembly 20 into and out of the storage compartment 10. A guide plate 16 is preferred but optional. The guide plate 16 may also be used to prevent the guide block assembly 22 from coming out of the storage compartment 10 when the step assembly 20 is not in the storage (or stowed) position. In its preferred embodiment in FIG. 3, the guide plate 16 has a downward protrusion 24 on either end to assist in restraining the guide block assembly 22.

Figure 4:
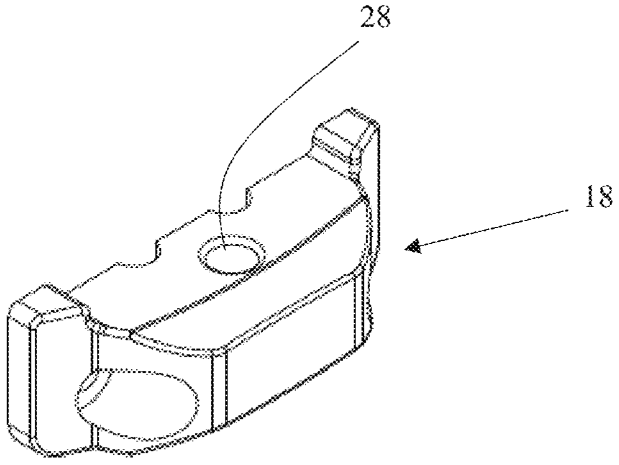
FIG. 4 is a perspective view of an embodiment of the storage compartment catch.

One embodiment of the storage compartment catch 18 is shown in FIG. 4. The storage compartment catch 18 can be positioned at the end of the storage compartment 10. The storage compartment catch 18 can be used to secure the step assembly 20 when in the storage compartment 10. The storage compartment catch 18 can have a recess 28 configured to receive a pin 34 or other structure contained in the step assembly 20.

Figure 5:
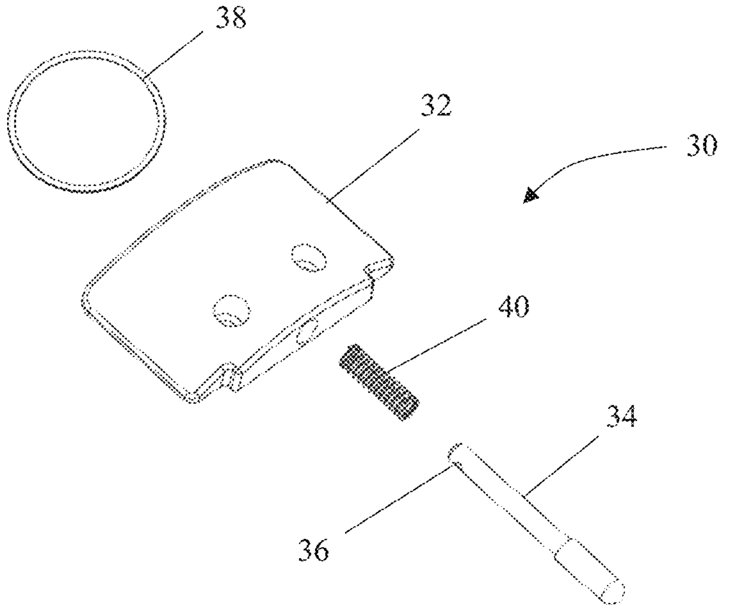
FIG. 5 is an exploded view of one embodiment of the catch pin assembly.
Figure 6:
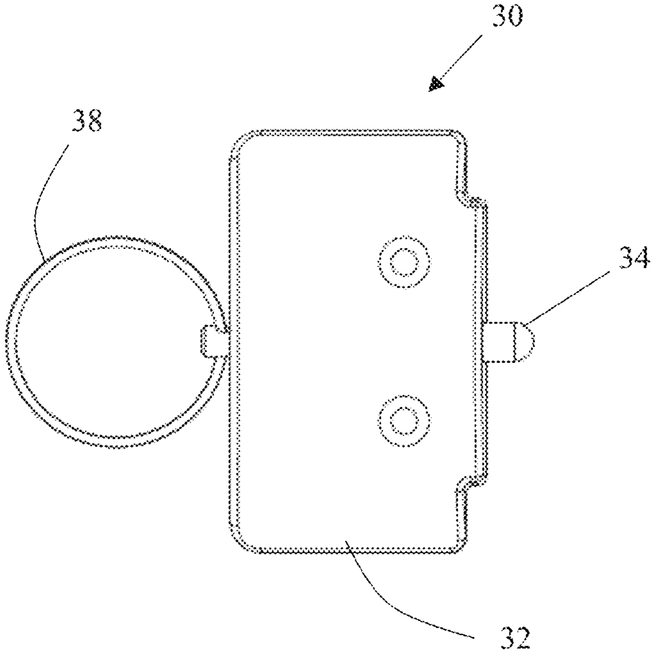
FIG. 6 is a front view of one embodiment of the catch pin assembly.

One embodiment of the catch pin assembly 30 is shown in FIGS. 5 and 6. The catch pin assembly 30 can be positioned at the end of the step assembly 20. In this embodiment, the catch pin assembly 30 can have a plate 32 through which a pin 34 passes. The pin 34 has a hole 36 at the top end through which a pull ring 38 or other structure passes through providing a mechanism for using the catch pin assembly 30 and pulling the pin 34 up. The catch pin assembly 30 may also have a spring 40 that rests under the top hole 36 and surrounds the pin 34 which enables the pin 34 to move up and/or down to unlock or lock the step assembly 20 from the storage compartment 10.

Figure 10:
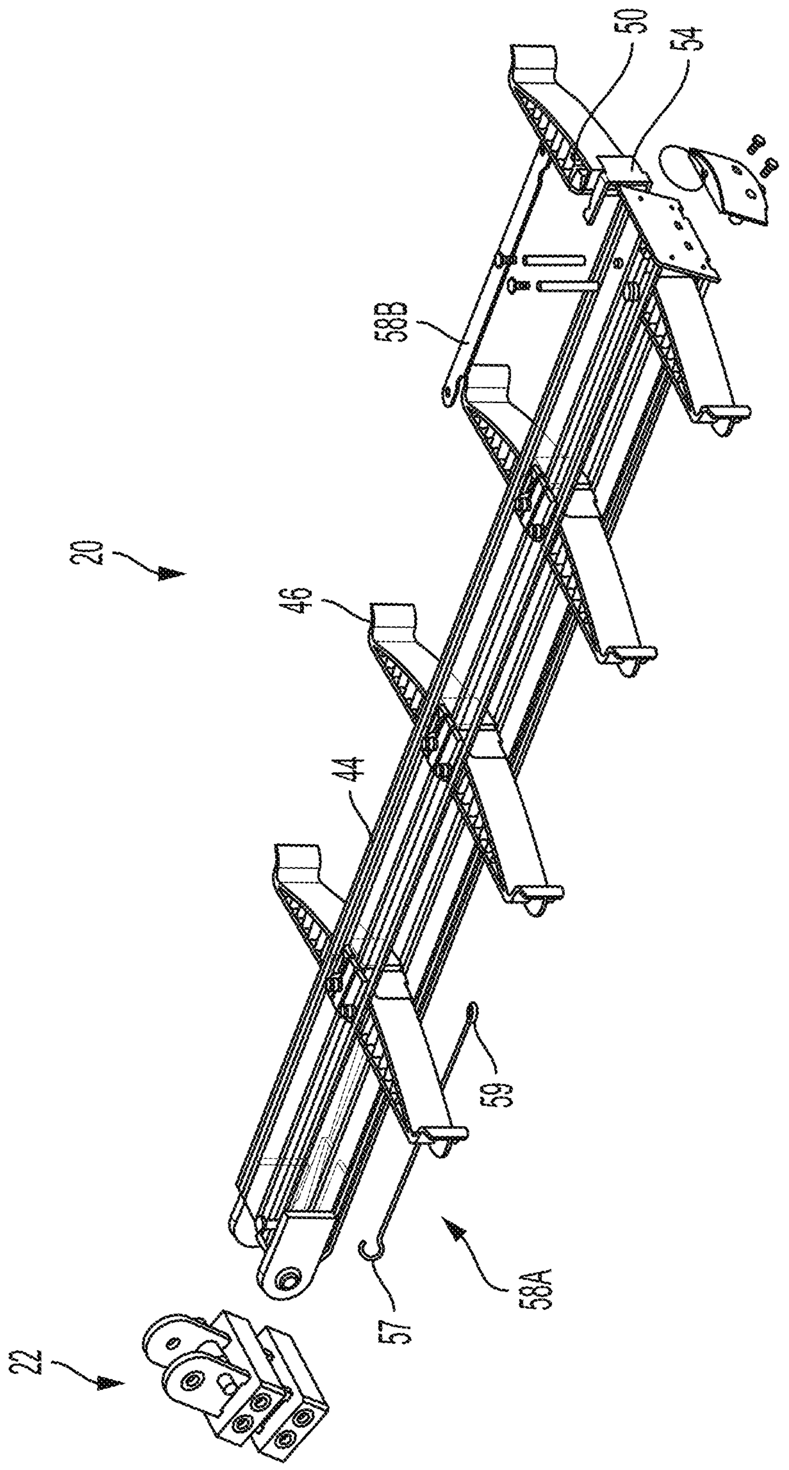
FIG. 10 is an exploded view of one embodiment of the step assembly and guide block assembly.
Figure 18:
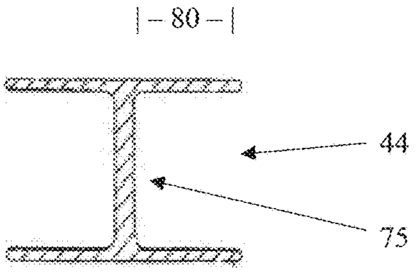
FIG. 18 is a perspective view of an embodiment of the elongated main support.
Figure 19:
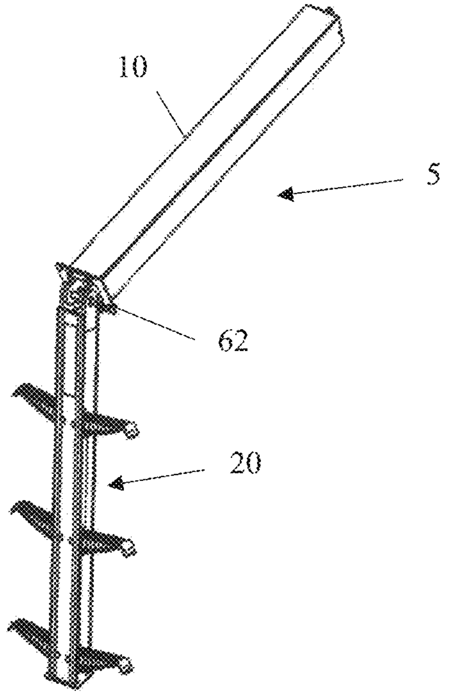
FIG. 19 is a perspective view of an embodiment of the ladder system.
Figure 20:
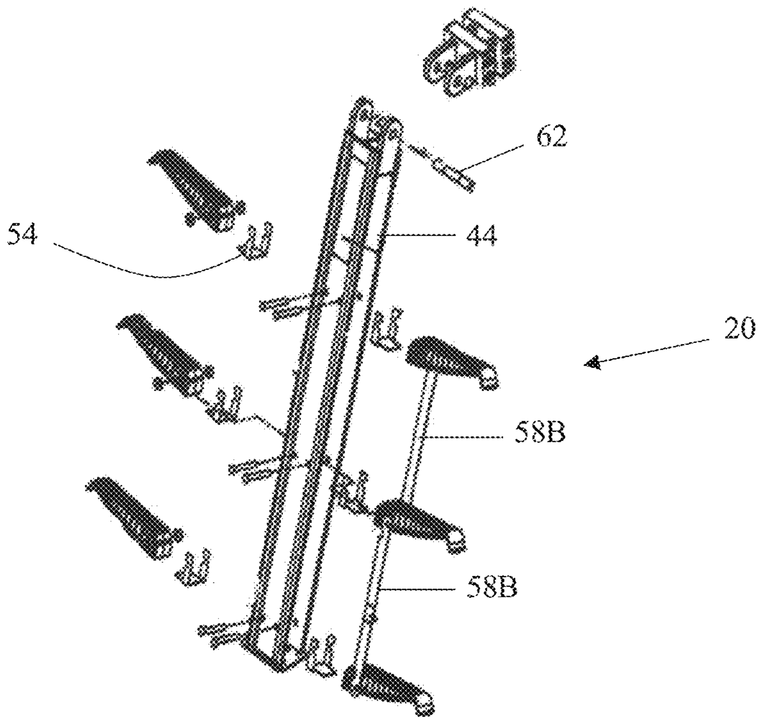
FIG. 20 is an exploded view of an embodiment of the step assembly and guide block assembly.
Figure 21:
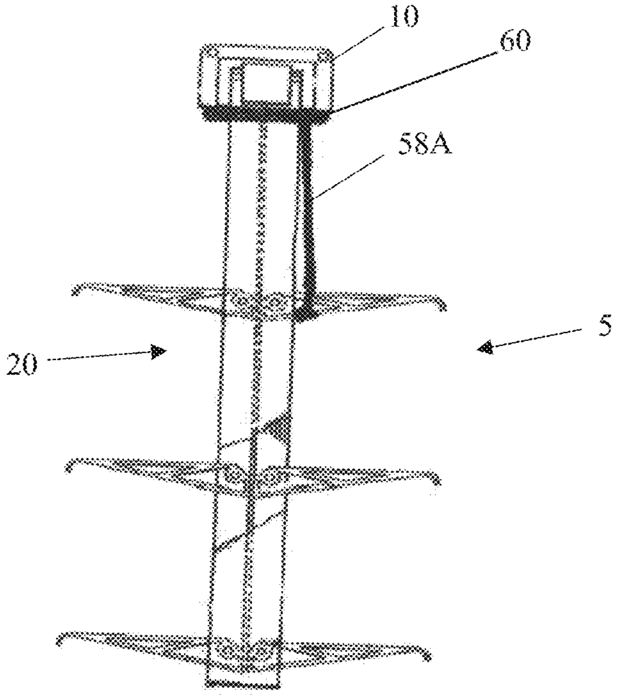
FIG. 21 is a front facing view of an embodiment of the ladder system.
Figure 22:
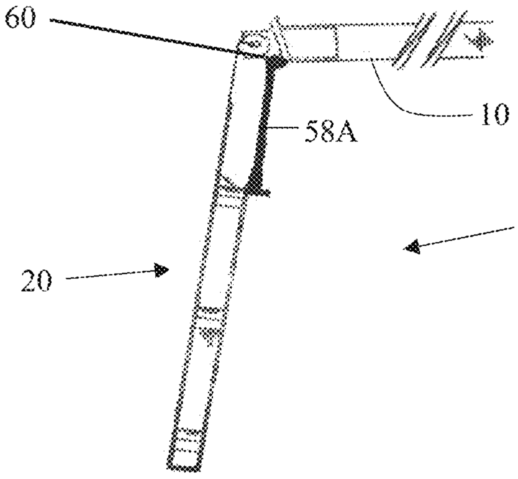
FIG. 22 is a side view of an embodiment of the ladder system.
Figure 23:
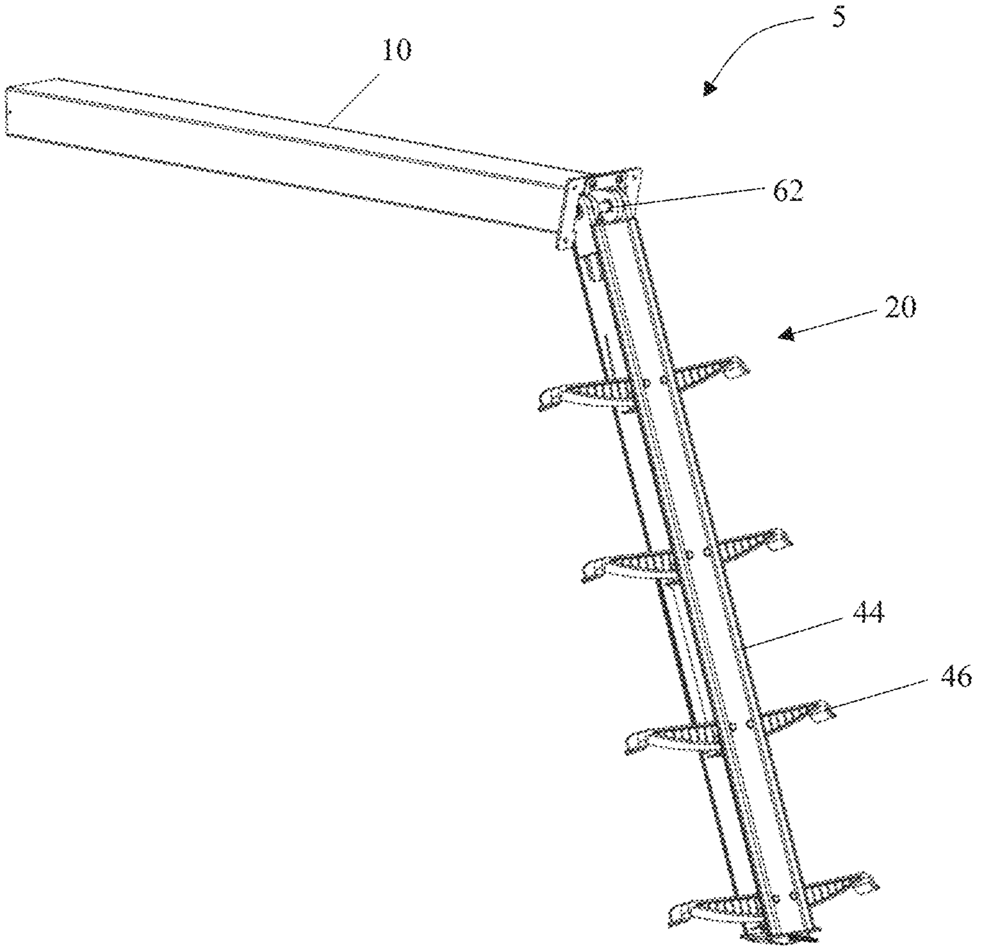
FIG. 23 is a side view of an embodiment of the ladder system.

In one embodiment, the ladder system 5 has a step assembly 20, an example of which is shown in FIG. 10. The step assembly 20 comprises an elongated main support 44. In a preferred embodiment, the elongated main support 44 is a rigid I-beam support, an example of which is shown in FIG. 18. In other embodiments, the elongated main support 44 can be a T-beam support. Other configurations of the elongated main support 44 may be used as long as the steps 46 can be stored and deployed as discussed herein.

Figure 7:
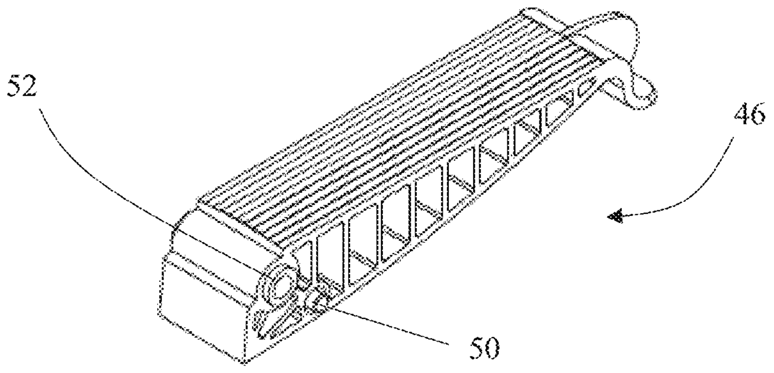
FIG. 7 is a perspective view of one embodiment of the step.

The step assembly 20 comprises at least one set of steps 46. One embodiment of the step 46 is shown in FIG. 7. In the embodiment shown in FIG. 7, the inner section of the step 46 (the portion closest to the elongated main support 44) comprises at least two holes, a top hole and a bottom hole. In a preferred embodiment, the holes pass though the entirety of the step 46. A step pin 52 passes through the top hole to connect the step 46 to the elongated main support 44. The step pin 52 can be secured by rivets. Also attached to the elongated main support 44 and the step 46 can be a step spacer 54. The step 46 may also have a support arm pin 50 positioned in the bottom hole that can be used to attach the upper and lower support arms 58A, 58B between the steps 46. The support arm 58A may also be referred to herein as an upper support arm 58A or a first support arm 58A. The support arm 58B may also be referred to herein as a lower support arm 58B or a second support arm 58B.

Figure 8:
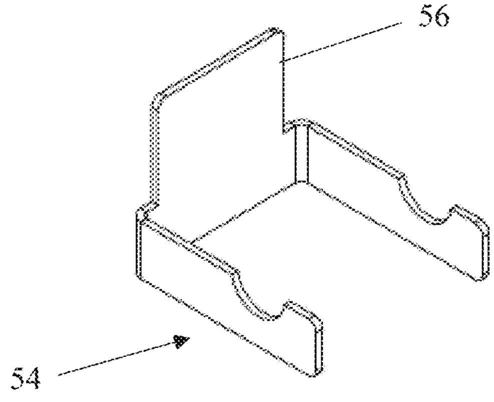
FIG. 8 is a perspective view of one embodiment of the step spacer.
Figure 25:
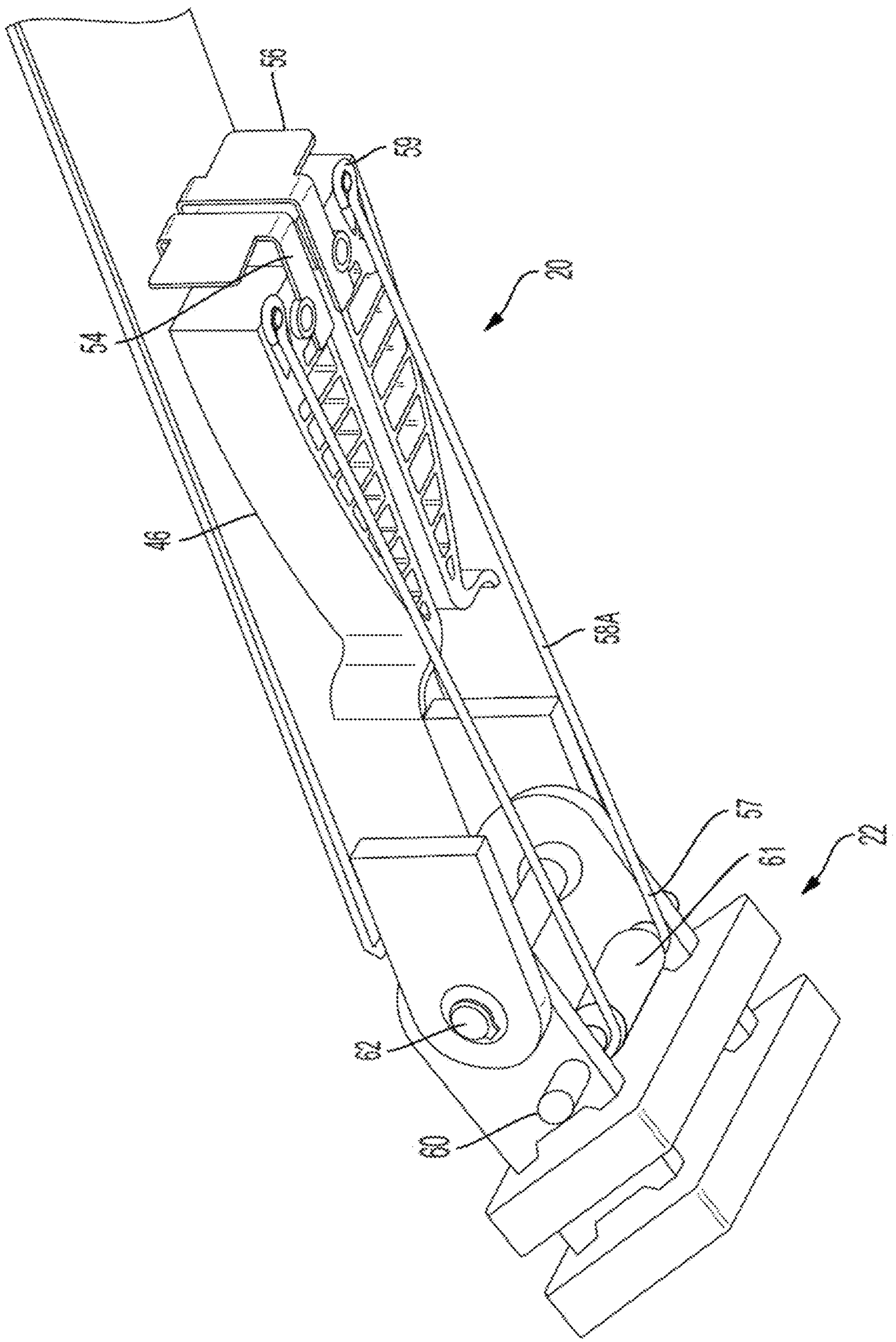
FIG. 25 is a bottom view of an embodiment of the step assembly and guide block assembly in the storage position.

One embodiment of a step spacer 54 is shown in FIG. 8. The step spacer 54 has two extended arms, both with notches at one end. The notches of the step spacer 54 match the notches on the top hole of a step 46. The step spacer 54 rests inside the elongated main support 44. In the preferred embodiment the step spacer platform 56 is no longer than the depth 80 of the elongated main support 44 recess 75. In the preferred embodiment the step spacer 54 is fixed, but in other embodiments it can be pivotally attached. When the step assembly 20 is in the use position, a step 46 will extend until it reaches the step spacer platform 56. When the step assembly 20 is in the storage position, there is a gap from the step 46 to the step spacer platform 56, as depicted in FIG. 25.

Figure 9:
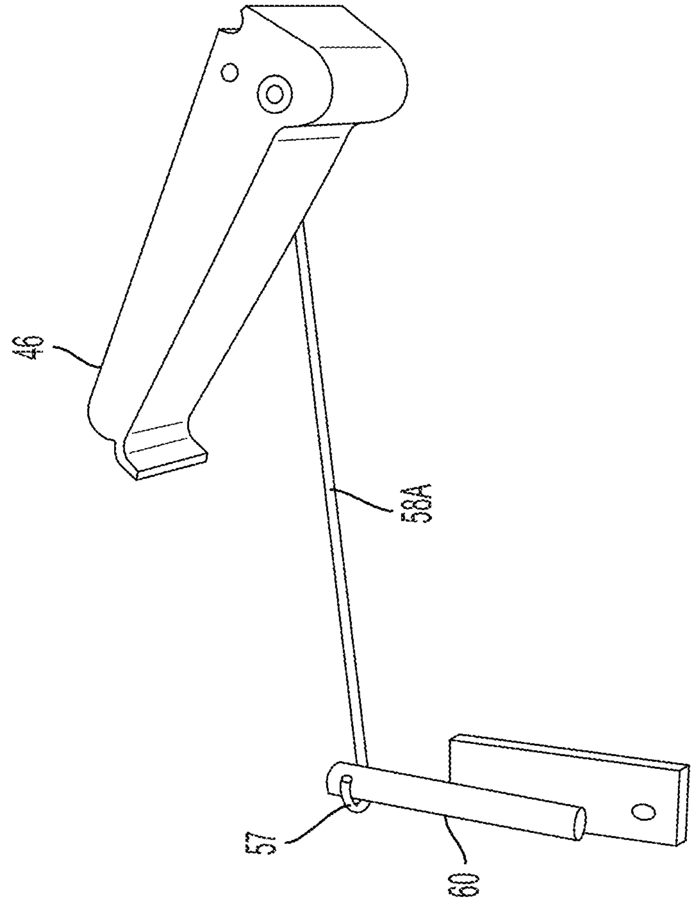
FIG. 9 is a view of one embodiment of a support arm connected to a pivot pin and a top step.
Figure 24:
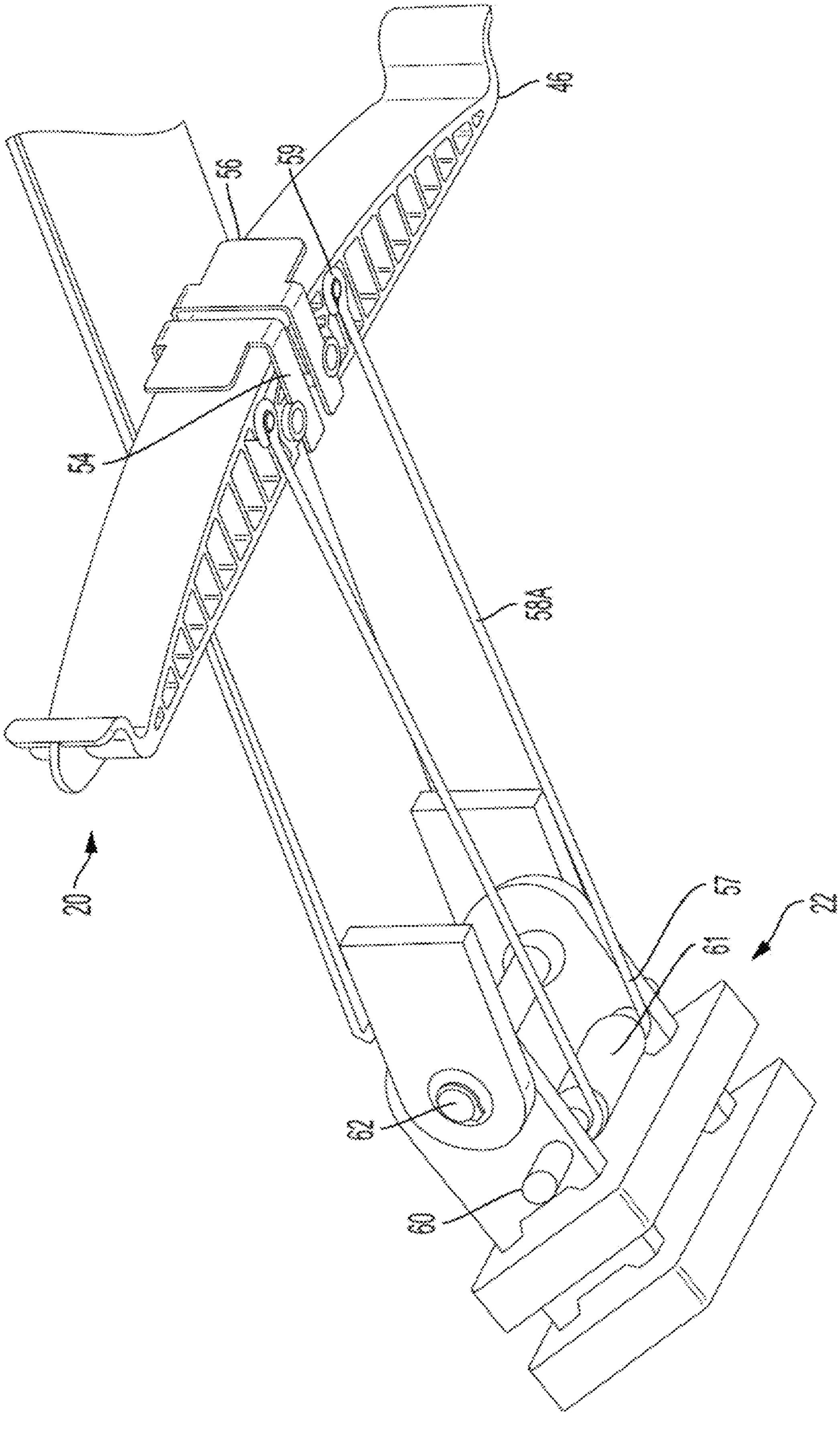
FIG. 24 is a bottom view of an embodiment of the step assembly and guide block assembly in the use position.

In some embodiments, an upper support arm 58A is used to connect the top step 46 (i.e., the step 46 closest to the guide block assembly 22) to some portion of the guide block assembly 22, and in a preferred embodiment, to the downstop pin 60 portion of the guide block assembly 22. One embodiment of this upper support arm 58A used for the top step 46 is shown in FIG. 9. In this embodiment, a first end 57 of the upper support arm 58A has a curved end that hooks around the internal section of the downstop pin 60 (i.e., positioned inside the U-plate 66 discussed further below), as shown in FIGS. 9,10, 24, and 25. FIGS. 24 and 25 also depict a spacer 61 which can surround the downstop pin 61 and prevent the upper support arms 58A from moving inward along the downstop pin 61. Notably, for FIGS. 24 and 25, the back side of the elongated main support beam 44 has been removed to allow for better visibility of the step 46 connections. This first end 57 is rotatably attached so that the first end 57 can rotate around the downstop pin 60. In this embodiment, the second end 59 of the upper support arm 58A can have a circular or curved opening that can be secured to either the front or back side of each of the top steps 46 and preferably attached to the support arm pin 50. In the preferred embodiments, the support arm pin 50 can have an enlarged end or a rivet to secure the second end 59 of the upper support arm 58A to the top step 46. The second end 59 of the upper support arm 58A is rotatably attached to the support arm pin 50. The first end 57 of the upper support arm 58A has a hook that is oriented at a 90 degree angle from the circular or curved opening on the second end 59 of the upper support arm 58A. The main body of the upper support arms 58A shown between the top step 46 and the downstop pin 60 are cylindrical metal rods.

Figure 11:
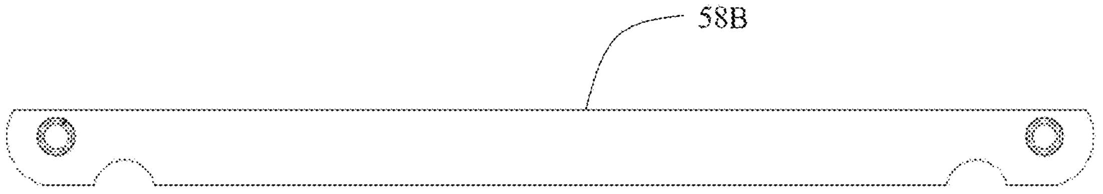
FIG. 11 is a perspective view of one embodiment of a support arm.

In some embodiments a number of lower support arms 58B are used to operatively connect the steps 46 such that when one step 46 is moved, one or more other steps 46 also move. It should be recognized that the upper and lower support arms 58A, 58B can have different configurations such that the upper support arm 58A used to attach the first step 46 to the guide block assembly 22 may be different than a lower support arm 58B used to connect the first step 46 to the second step 46, and which may be different than a support arm used to connect the second step 46 to the third step 46, etc. One embodiment of another configuration for a lower support arm 58B that may be used to connect the second step 46 to the third step 46 (and other lower steps) is shown in FIG. 11. As shown in FIG. 11, each end of the lower support arm 58B may have a hole and curved indentations to accommodate other structure of the step assembly 20. In this embodiment, a first end 57 of the lower support arm 58B connects, on either the front or back side of a step 46, to the bottom hole in a step 46 by the support arm pin 50. The first end 57 of the lower support arm 58B is rotatably attached so that the first end 57 and the support arm pin 50 can rotate around each other. Again, the support arm pin 50 may have an enlarged end or rivet to secure the lower support arm 58B in place. The second end 59 of the lower support arm 58B connects to the step 46 below on either the front or back side of the step 46, matching the step 46 above. Along the first side of the elongated main support 44, the upper and lower support arms 58A, 58B alternate between the front and back of the steps 46, such that each step 46, except the last step 46, has one or more of the upper support arms 58A or the lower support arms 58B connected on both the front and back side of the bottom hole of the step 46. The second side of the elongated main support 44 can mirror the alternations on the first side, or it can be opposite. This connection is such that when one step 46 moves, the attached step 46 moves in unison.

Figure 12:
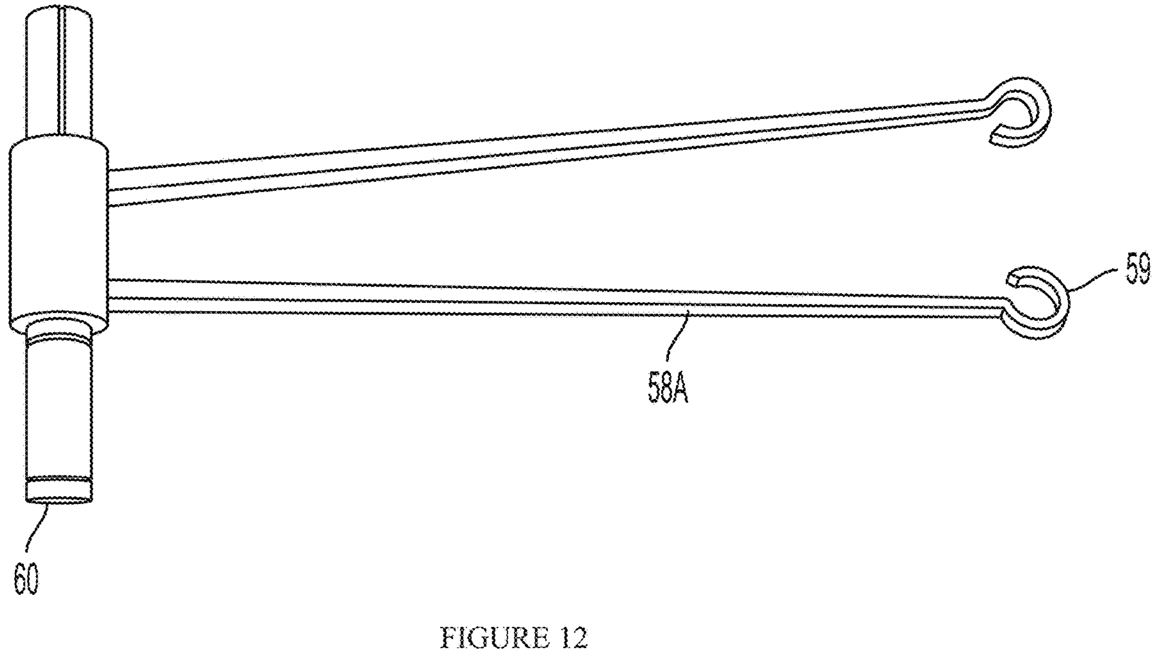
FIG. 12 is a front view of one embodiment of a support arm.

In another embodiment two upper support arms 58A are connected together at one end and positioned around the downstop pin 60 as shown in FIG. 12. The opposite or second end 59 of the upper support arm 58A connects to the top step 46 in the same manner as described above.

In the preferred embodiment, the elongated main support 44 is connected to the guide block assembly 22 through a pivot pin 62. This connection enables the elongated main support 44 to pivot up and down. In a preferred embodiment, a guide block assembly 22 contains a second pin, a downstop pin 60. In this embodiment the downstop pin 60 prevents the elongated main support 44 (and the step assembly 20) from pivoting farther than 15 degrees from vertical. In other embodiments, the downstop pin 60 prevents the elongated main support 44 and step assembly 20 from rotating farther than 30 degrees from the vertical.

Figure 13:
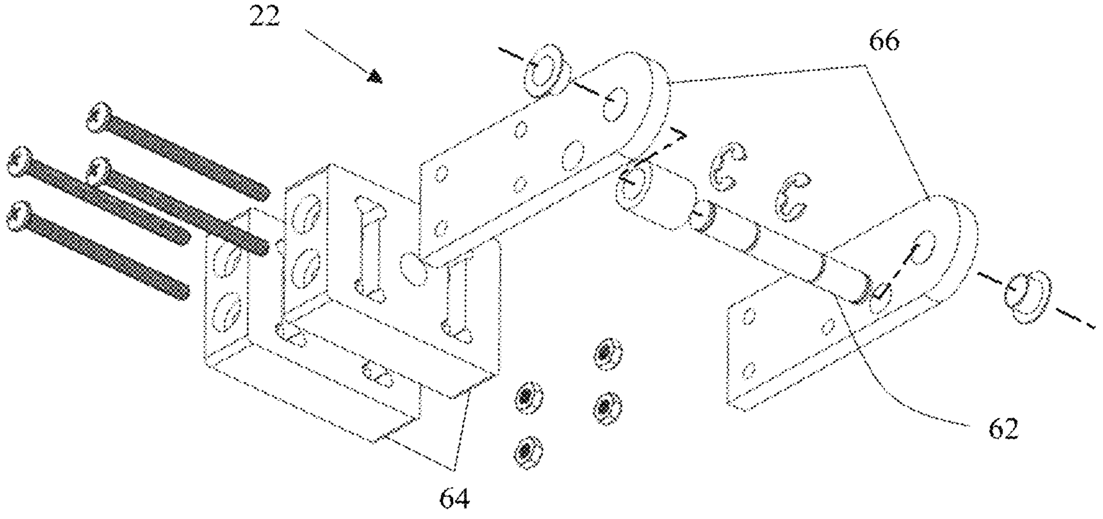
FIG. 13 is an exploded view of an embodiment of the guide block assembly.
Figure 14:
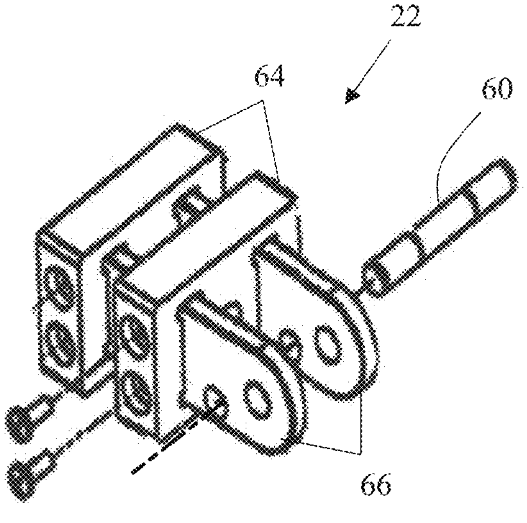
FIG. 14 is a perspective view of an embodiment of the guide block assembly.

Embodiments of the guide block assembly 22 are shown in FIGS. 13 and 14. The guide block assembly 22 may contain two blocks 64 connected with screws attaching it to two U-plates 66 which hold the downstop pin 60 and the pivot pin 62. The guide block assembly 22 enables the elongated main support 44 to slide in and out of the storage compartment 10. The downstop pin 60 is optional. In the preferred embodiments shown in the drawings, the upper support arms 58A are shown as attached to the downstop pin 60, so if the downstop pin 60 is omitted, the upper support arms 58A would have to be attached elsewhere, for example, on some other portion of the guide block assembly 22, including the pivot pin 62.

As detailed above, to move the step assembly 20 from the storage position to the use position, the pin 34 is released from the storage compartment catch 18 and the step assembly 20 is removed from the storage compartment 10. Once the guide block assembly 22 meets the guide plate 16, it stops and the step assembly 20 can be pivoted downward at the pivot pin 62. Preferably, the steps 46 do not start to deploy or rotate until the step assembly 20 is pivoted downward. As the step assembly 20 pivots downward the upper support arm 58A connected to the top step 46 pushes the step 46 down and out, through the bottom hole. Because the upper support arm 58A is connected to the bottom hole of the step 46, as the step 46 is pushed down, the bottom hole is moved farther away from the guide block assembly 22. Through this mechanism, the step 46 transitions from the storage position to the use position, essentially perpendicular to the elongated main support 44.

When an embodiment has more than one set of steps 46, the movement of all steps 46 are in unison through the upper and lower support arm 58A, 58B connections. To return the step assembly 20 to the storage position, the step assembly 20 can be pivoted upward which returns the steps 46 to their storage position. In the storage position, the steps 46 can be self-contained within the elongated main support 44. As shown in the drawings, the elongated main support 44 preferably has a recess 75 configured to be large enough such that when the steps 46 are rotated into the storage position, the steps 46 are completely contained within such recess 75, and no portion of the steps 46 protrudes outside of the outer edges of the elongated main support 44.

With reference to FIG. 18, if the elongated main support 44 is an I beam configuration, the elongated main support recess 75 has a depth 80 sufficient to accommodate the maximum height of the step 46 (measured from the "top" where the user would place their feet to the opposite side).

In an alternate embodiment the steps 46 are friction fit to the main support 44. In this embodiment, one or more of the upper support arms 58A or the lower support arms 58B can be omitted, and the steps 46 are manually deployed by pulling the steps 46 from their storage position to their use position. As described above, the steps 46 can also be connected through upper and lower support arms 58A, 58B such that when one step 46 is moved, all of the steps 46 move in unison.

Figure 15:
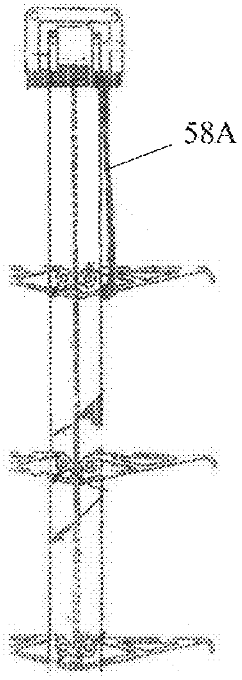
FIG. 15 is a front facing view of an embodiment of the remote controlled ladder system.
Figure 16:
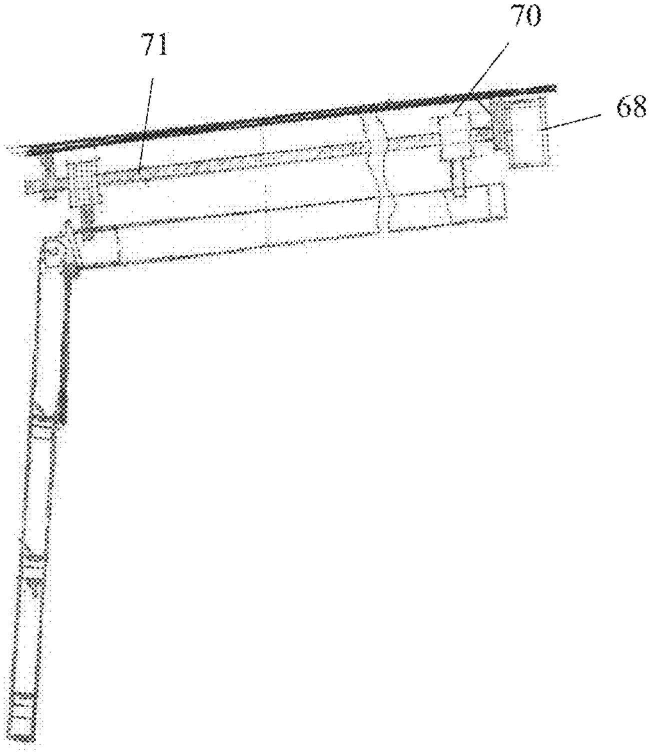
FIG. 16 is a side view of an embodiment of the remote controlled ladder system.
Figure 17:
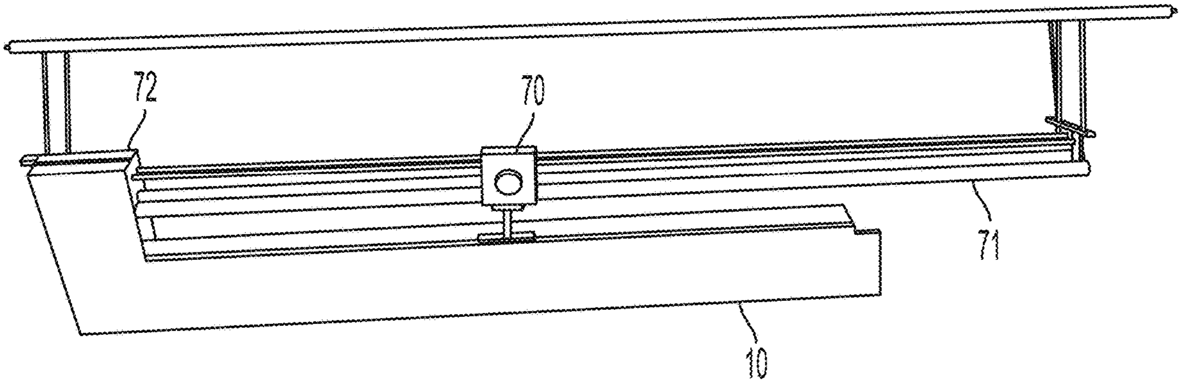
FIG. 17 is a side view of an embodiment of the remote controlled ladder system shown between a deployed position and a stowed position but without the ladder assembly depicted.

Another embodiment is shown in FIGS. 15, 16, and 17. FIGS. 15 and 16 show the embodiment in a deployed position. FIG. 16 also shows the alternative position of the linear motion actuator 70 when in a stowed position. FIG. 17 shows an embodiment between a deployed position and a stowed position but without the ladder assembly depicted.

In these embodiments, the step assembly 20 can be deployed automatically by activating a switch or pressing a remote controlled button to activate a linear motion actuator 70. The linear motion actuator 70 is connected to the step assembly 20 (which may be the guide block assembly 22 or the elongated main support 44 or other portion). The linear motion actuator 70 operates along a guide rail 71 that runs substantially parallel to the storage compartment 10. The linear motion actuator 70 is designed to move the step assembly 20 mechanically, by replicating a user simply pulling the step assembly 20 out of the storage compartment 10.

In the embodiment shown in FIGS. 15-17, the linear motion actuator 70 uses a reversible motor 68, and a traveling nut, and the rail 71 is an Acme type screw. The motor engages the Acme type screw rail 71 to rotate it, causing the traveling nut to move forward (or backwards) along the rail. In this embodiment, the traveling nut is connected to the step assembly 20. Other linear motion actuators can also be used. The automatic deployment embodiment may also use a limit switch 72, at which point the linear motion actuator 70 disengages. As the linear motion actuator 70 moves along the storage compartment 10, it drives the step assembly 20 out of the storage compartment 10. The steps 46 are either automatically deployed or manually deployed as described in the above embodiments.

In some embodiments, there can be an electric switch on the boat dashboard and/or on the back of the boat near the ladder to enable the automatic deployment embodiment opening or closing of the ladder.

In some embodiments, a sensor can be used on the step assembly 20 that can detect whether it is in the water. This sensor can be operatively connected (including wirelessly) to an indicator light on the dashboard of the boat that indicates when the ladder is in the water. In another embodiment, there may be an indicator light on the back of the boat indicating when the ladder is in the water. Additional embodiments also include use of an alarm if someone attempts to start the boat while the ladder is still in the water.

I claim:

1. A compactable ladder, comprising:

a. an elongated main support beam;

b. at least one set of steps attached to said elongated main support beam and rotatable between a use position and a storage position;

c. an elongated hollow storage tube for storing said elongated main support beam and said steps;

d. a guide block assembly pivotably attached to the elongated main support beam; and e. at least one upper support arm having a first terminal end and a second terminal end, wherein the first terminal end is connected to the guide block assembly and the second terminal end is connected to a step of the at least one set of steps positioned closest to the guide block assembly, and wherein the step positioned closest to the guide block assembly is automatically rotated from the storage position to the use position when the elongated main support beam is pivoted downward about the guide block assembly.

2. The compactable ladder system of claim 1, further comprising at least one step spacer housed within said elongated main support beam which provides support to the at least one step of the at least one set or steps when in its use position.

3. The compactable ladder system of claim 1, further comprising a catch attached at an end of said storage tube.

4. The compactable ladder system of claim 3, further comprising a catch pin attached to said elongated main support beam which engages with the catch to provide a locking mechanism for the compactable ladder system.

5. The compactable ladder system of claim 1, wherein the guide block assembly comprises a pivot pin, and wherein the first terminal end is hook shaped and configured to connect to the pivot pin.

6. The compactable ladder system of claim 5, wherein the step positioned closest to the guide block assembly has a support arm pin, and wherein the second terminal end is attached to the support arm pin.

7. The compactable ladder system of claim 6, wherein the second terminal end is rotatable around the support arm pin.

8. The compactable ladder system of claim 1, wherein the main support beam is an I-beam having a recess, and wherein the step has a height that fits within the recess when in the storage position.

9. The compactable ladder system of claim 1, wherein the first terminal end is hook shaped and the second terminal end is rotatably attached to the step positioned closest to the guide block assembly.

10. The compactable ladder system of claim 1, further comprising a lower support arm connecting the step positioned closest to the guide block assembly to a next step of the at least one set of steps positioned along the elongated main support beam and wherein when the step positioned closest to the guide block assembly is rotated to the use position, the next step positioned along the elongated main support beam is also rotated to the use position.

11. A compactable ladder, comprising:

a. an elongated main support beam;

b. a plurality of steps attached to said elongated main support beam and rotatable between a use position and a storage position;

c. a guide block assembly rotatably attached at one end of said elongated main support beam;

d. at least one upper support arm connected at a first terminal end to the guide block assembly and connected at a second terminal end to a step of the plurality of steps positioned closest to the guide block assembly, and configured to rotate at least the step of the plurality of steps from the storage position to the use position when the elongated main support beam is rotated about the guide block assembly.

12. The compactable ladder system of claim 11, further comprising a linear motion actuator connected to said guide block assembly or elongated main support beam and configured to move the compactable ladder system from a first position to a second position.

13. The compactable ladder system of claim 12, further comprising a limit switch to disengage said linear motion actuator when in the second position.

14. The compactable ladder system of claim 12, wherein the linear motion actuator comprises a reversible motor, a traveling nut, and an Acme screw rail.

15. The compactable ladder system of claim 11, further comprising a lower support arm connecting the step positioned closest to the guide block assembly to a next step of the plurality of steps positioned along the elongated main support beam and wherein when the step positioned closest to the guide block assembly is rotated to the use position, the next step positioned along the elongated main support beam is also rotated to the use position.

16. A ladder system comprising:

a. a main support wherein said main support is an I-beam;

b. a plurality of steps attached to said main support I-beam and rotatable between a use position and a storage position;

c. a guide block assembly rotatably attached at one end of said main support I-beam and having a pivot pin;

d. at least one step spacer housed within a recess in the main support I-beam that supports the step when in the use position;

e. a first support arm having a first end and a second end, wherein the first support arm first end hooks to the pivot pin in the guide block assembly and the first support arm second end is connected to a step of the plurality of steps positioned closest to the guide block assembly; and f. a second support arm having a first end and a second end, wherein the second support arm first end is attached to the step positioned closest to the guide block assembly and the second support arm second end is attached to a next step of the plurality of steps positioned along the main support I-beam; and wherein the step positioned closest to the guide block assembly as and the next step positioned along the main support I-beam are automatically rotated from the storage position to the use position when the main support L-beam is pivoted downward about the guide block assembly.

17. The ladder system of claim 16, further comprising an elongated storage tube for storing said main support I-beam.

18. The ladder system of claim 16, further comprising a linear motion actuator connected to said guide block assembly or main support I-beam and configured to move the compactable ladder system from a first position to a second position.

19. The ladder system of claim 16, wherein each step is connected to the next step positioned along the main support I-beam by a support arm such that when the step above it is moved to the use position, the step positioned below also moves to the use position.

20. The ladder system of claim 16, further comprising an elongated storage container for housing the main support I-beam, said storage container comprising a catch positioned at one end, and wherein the main support I-beam further comprises a catch pin which engages with the storage container catch to lock the main support I-beam in place.

* * * * *